UNITED STATES PATENT OFFICE.

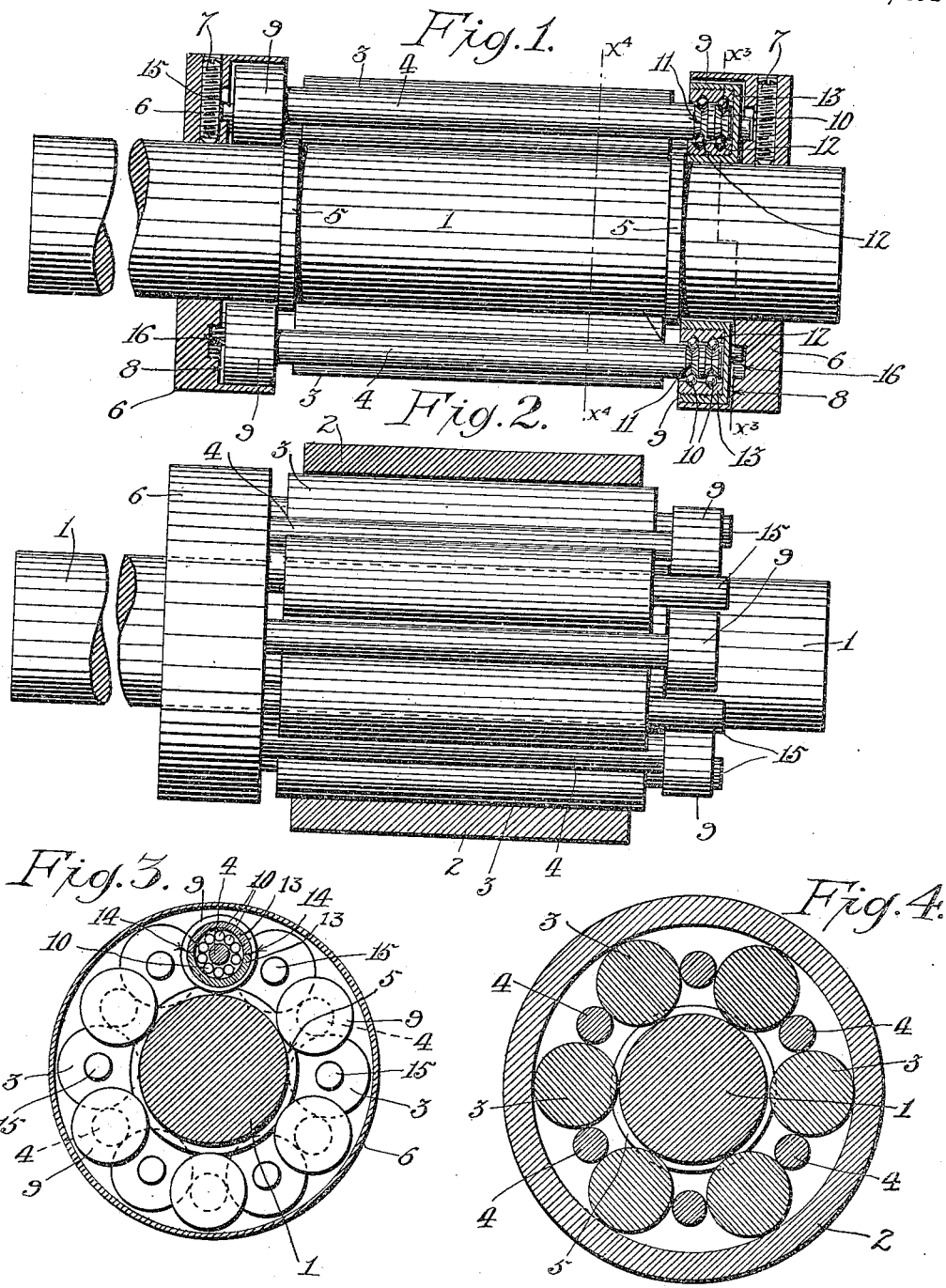

HARRY C. BERRY, OF LOS ANGELES, CALIFORNIA.

ROLLER-BEARING.

952,667.

Specification of Letters Patent. Patented Mar. 22, 1910.

Application filed March 26, 1907. Serial No. 364,730.

*To all whom it may concern:*

Be it known that I, HARRY C. BERRY, a citizen of the United States, residing at Los Angeles, in the county of Los Angeles and State of California, have invented a new and useful Roller-Bearing, of which the following is a specification.

The main object of the present invention is to provide a roller bearing wherein all friction due to rubbing contacts is avoided.

The invention relates to the class of roller bearings wherein the bearing rollers are spaced apart by spacing rollers. Said spacing rollers are necessarily of smaller diameter than the bearing rollers, and means are provided to guide the spacing rollers, and rubbing friction is liable to occur when the spacing rollers are so guided. My invention eliminates such rubbing friction by providing antifriction devices for guiding the spacing rollers in the bearing.

A further object of the invention is to provide means for holding the bearing rollers as well as the spacing rollers in place.

In the accompanying drawings:—Figure 1 is a longitudinal section of the bearing. Fig. 2 is an elevation of the bearing with the outer bearing member in section and one of the end members of the bearing removed.
Fig. 3 is a cross section on the line $x^3$—$x^3$ Fig. 1. Fig. 4 is a section on the line $x^4$—$x^4$ Fig. 1.

The inner bearing 1 may be any suitable shaft or journal and the outer bearing 2, see Figs. 2 and 4, may be any suitable box, sleeve, or other bearing member. The bearing rollers 3 roll between the inner and outer bearing members and are spaced apart by spacing rollers 4. The bearing rollers are larger than the spacing rollers and are retained against longitudinal motion on the shaft or inner bearing member by flanges 5 on the inner bearing member. Two collars 6 are provided at the respective ends of the bearing, said collars being fastened, as by means of screws 7, to the inner bearing member and having on their inner faces annular recesses 8, and the spacing rollers are provided with antifriction means extending within these annular recesses to guide the spacing rollers by engagement with the outer wall of the annular recess without rubbing friction. This antifriction means consists preferably of caps 9 rotatably mounted on the ends of the spacing rollers and of a diameter such that they can roll freely within the recess, bearing on the outer wall of the recess with slight radial play. To prevent rubbing friction of these caps on the spacing rollers, antifriction balls 10 are provided running in grooves 11, preferably V-shaped, in the spacing rollers, and in grooves 12, preferably V-shaped, in collars 13 surrounding the spacing rollers, there being preferably two series of balls and grooves at each end of the spacing rollers forming a double ball bearing at each end so as to give firm support and guide for the rollers. To facilitate placing the balls and collars in place, the collars are split as shown at 14 in Fig. 3 and are screw-threaded, the caps 9 being interiorly screw-threaded so that the balls and collars 13 can be assembled on the spacing rollers and then the cap screwed over said collars 13 to hold them with the contained balls in place on the spacing roller. The bearing rollers 3 have axial extensions 15 of reduced or smaller diameter than the bearing portion of said rollers, said extensions extending between the rolling caps of the spacing rollers without touching the same and extending within an annular groove 16 in the collar 6 at each end of the bearing, this axial extension normally not touching the walls of the said groove, but being retained thereby from falling out of place, if for any reason the outer bearing member is removed.

What I claim is:—

1. A roller bearing comprising bearing members, bearing rollers, spacing rollers, an antifriction member at each end of each spacing roller, and external means for engaging with said antifriction members and holding them and the spacing rollers against radial outward movement.

2. A roller bearing comprising an inner bearing member, collars thereon having annular recesses, bearing rollers rolling on said inner member, spacing rollers between the bearing rollers, and antifriction means on the spacing rollers rolling within the annular recesses in said collars.

3. A roller bearing comprising an inner bearing member, bearing rollers, spacing rollers and antifriction means rotatable on said spacing rollers, and means for engaging with said antifriction means and holding them and the spacing rollers against radial outward movement.

4. A roller bearing comprising inner and outer bearing members, bearing rollers, spacing rollers, an antifriction member on each end of each spacing roller containing balls bearing on the spacing roller, and means for engaging with said antifriction members and holding them and the spacing rollers in position.

5. A roller bearing comprising an inner bearing member, bearing rollers and spacing rollers, split collars surrounding the spacing rollers, bearing balls for the spacing rollers, caps screwing on said collars to hold same in place on the bearing balls, and means for engaging with the collars and holding them and the spacing rollers against radial outward movement.

6. A roller bearing comprising bearing members, collars on one of said members having annular recesses and annular grooves, bearing rollers having reduced extensions engaging in said grooves, spacing rollers, and antifriction means rotatably mounted on the ends of the spacing rollers and extending within the said recesses and between the reduced ends of the bearing rollers.

In testimony whereof, I have hereunto set my hand at Los Angeles, California, this 18th day of March 1907.

HARRY C. BERRY.

In presence of—
ARTHUR P. KNIGHT,
FRANK L. A. GRAHAM.